(12) United States Patent
Setton et al.

(10) Patent No.: US 9,262,753 B2
(45) Date of Patent: Feb. 16, 2016

(54) VIDEO MESSAGING

(71) Applicant: TangoMe, Inc., Mountain View, CA (US)

(72) Inventors: Eric Setton, Menlo Park, CA (US); Jamie Odell, Foster City, CA (US)

(73) Assignee: TangoMe, Inc., Mountain View, CA (US)

( * ) Notice: Subject to any disclaimer, the term of this patent is extended or adjusted under 35 U.S.C. 154(b) by 0 days.

(21) Appl. No.: 14/572,496

(22) Filed: Dec. 16, 2014

(65) Prior Publication Data

US 2015/0106240 A1    Apr. 16, 2015

Related U.S. Application Data

(62) Division of application No. 13/309,371, filed on Dec. 1, 2011, now Pat. No. 8,941,707.

(51) Int. Cl.
| | |
|---|---|
| *H04N 7/15* | (2006.01) |
| *G06Q 20/12* | (2012.01) |
| *H04L 12/58* | (2006.01) |
| *H04M 1/725* | (2006.01) |
| *H04M 3/53* | (2006.01) |
| *H04N 7/14* | (2006.01) |
| *H04L 12/18* | (2006.01) |
| *G06Q 30/06* | (2012.01) |

(52) U.S. Cl.
CPC ............ *G06Q 20/123* (2013.01); *G06Q 20/127* (2013.01); *G06Q 30/0641* (2013.01); *H04L 12/1818* (2013.01); *H04L 12/58* (2013.01); *H04L 51/00* (2013.01); *H04M 1/72555* (2013.01); *H04M 3/5315* (2013.01); *H04N 7/14* (2013.01); *H04N 7/147* (2013.01); *H04N 7/15* (2013.01)

(58) Field of Classification Search
CPC ..... H04L 12/58; H04L 51/00; H04L 12/1818; H04M 1/72555; H04M 3/5315; H04N 7/14; H04N 7/147
USPC .......................... 348/14.01–14.16; 705/44, 38
See application file for complete search history.

(56) References Cited

U.S. PATENT DOCUMENTS

| | | |
|---|---|---|
| 6,396,906 B1 | 5/2002 | Kaplan |
| 6,501,834 B1 | 12/2002 | Milewski et al. |
| 6,954,136 B2 | 10/2005 | Sauer |
| 7,721,946 B2 | 5/2010 | Peccora et al. |
| 7,965,309 B2 | 6/2011 | Mattila et al. |
| 8,086,222 B2 | 12/2011 | Vaananen |
| 8,311,519 B2 | 11/2012 | Kim |
| 8,396,456 B2 | 3/2013 | Brackbill et al. |
| 8,547,413 B2 | 10/2013 | Choi |
| 8,941,707 B2 | 1/2015 | Setton et al. |
| 2002/0042913 A1 | 4/2002 | Ellis et al. |

(Continued)

FOREIGN PATENT DOCUMENTS

EP    2265020 A2    12/2010

OTHER PUBLICATIONS

"International Search Report PCT/2012/066465", Feb. 28, 2013, 15 pages.

*Primary Examiner* — Melur Ramakrishnaiah

(57) ABSTRACT

A method for video messaging includes recording a video message, at a device, for a recipient; and selecting a contact as a recipient of the video message, at the device, without requiring typing at the device.

5 Claims, 12 Drawing Sheets

(56) References Cited

U.S. PATENT DOCUMENTS

| | | |
|---|---|---|
| 2002/0044632 A1 | 4/2002 | Kaplan |
| 2003/0137401 A1 | 7/2003 | Sauer |
| 2008/0068447 A1 | 3/2008 | Mattila et al. |
| 2008/0201422 A1 | 8/2008 | Peccora et al. |
| 2008/0207176 A1 | 8/2008 | Brackbill et al. |
| 2009/0285394 A1* | 11/2009 | Diamond ............ 380/259 |
| 2009/0305679 A1 | 12/2009 | Kim |
| 2010/0027777 A1 | 2/2010 | Gupta et al. |
| 2011/0279640 A1 | 11/2011 | Choi |
| 2012/0086769 A1 | 4/2012 | Huber et al. |
| 2012/0209770 A1* | 8/2012 | Peruvemba et al. ............ 705/44 |
| 2013/0030987 A1* | 1/2013 | Zuckerberg et al. ............ 705/39 |

\* cited by examiner

1000

```
VIEW A VIDEO MESSAGE AT A FIRST DEVICE, WHEREIN THE VIDEO MESSAGE IS
FROM A USER OF A SECOND DEVICE
1010
```

```
PROMPT A USER OF THE FIRST DEVICE TO CALL THE USER OF THE SECOND
DEVICE WHILE VIEWING THE VIDEO MESSAGE
1020
```

1200

```
DISPLAY A LIST OF VIDEO MESSAGES, WHEREIN A FIRST SUBSET OF THE VIDEO
MESSAGES IN THE LIST ARE NOT ACCESSIBLE FOR PLAYBACK
1210
          │
          ▼
ALLOW FOR SELECTION OF THE VIDEO MESSAGES
1220
          │
          ▼
IN RESPONSE TO SELECTING A VIDEO MESSAGE OF THE FIRST SUBSET, PROMPT A
USER TO PURCHASE ACCESS TO PLAYBACK THE VIDEO MESSAGE OF THE FIRST
SUBSET SELECTED BY THE USER
1230

PROMPT THE USER TO PURCHASE A RECURRENT SUBSCRIPTION
    1232

PROMPT THE USER TO PURCHASE A NON-RECURRING TRIAL SUBSCRIPTION
    1234

PROMPT THE USER TO PURCHASE A ONE-TIME FEE SUBSCRIPTION
    1235
```

FIG. 12

VIDEO MESSAGING

CROSS-REFERENCE TO RELATED APPLICATIONS

This application is a divisional application of and claims priority to and benefit of co-pending U.S. patent application Ser. No. 13/309,371 filed on Dec. 1, 2011, entitled "VIDEO MESSAGING," by Eric Setton et al., and assigned to the assignee of the present application.

BACKGROUND

Participants in a video conference communicate with one another by transmitting audio/video signals to one another. For example, participants are able to interact via two-way video and audio transmissions simultaneously. However, the participants may not be able to completely articulate what they are attempting to communicate to one another based solely on the captured audio captured by microphones and video signals captured by video cameras.

BRIEF DESCRIPTION OF THE DRAWINGS

FIG. 12 illustrates an embodiments of a method for monetization of video messaging.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
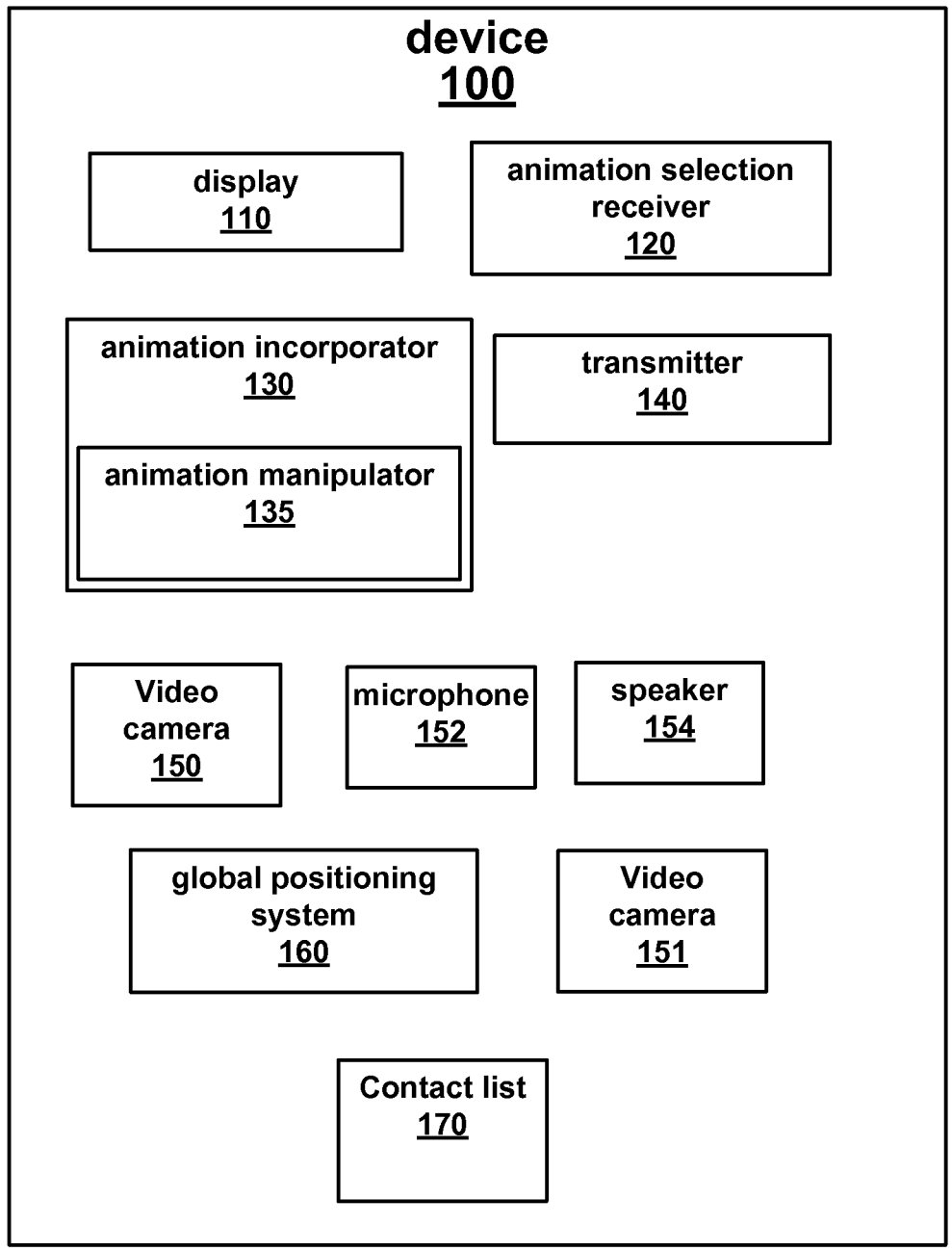
FIGS. 1-5 and 11 illustrate embodiments of devices.

FIG. 1 depicts an embodiment of device 100. Device 100 is configured for participation in a video conference. Moreover, device 100 is further configured to generate and/or receive video messages.

Figure 2:
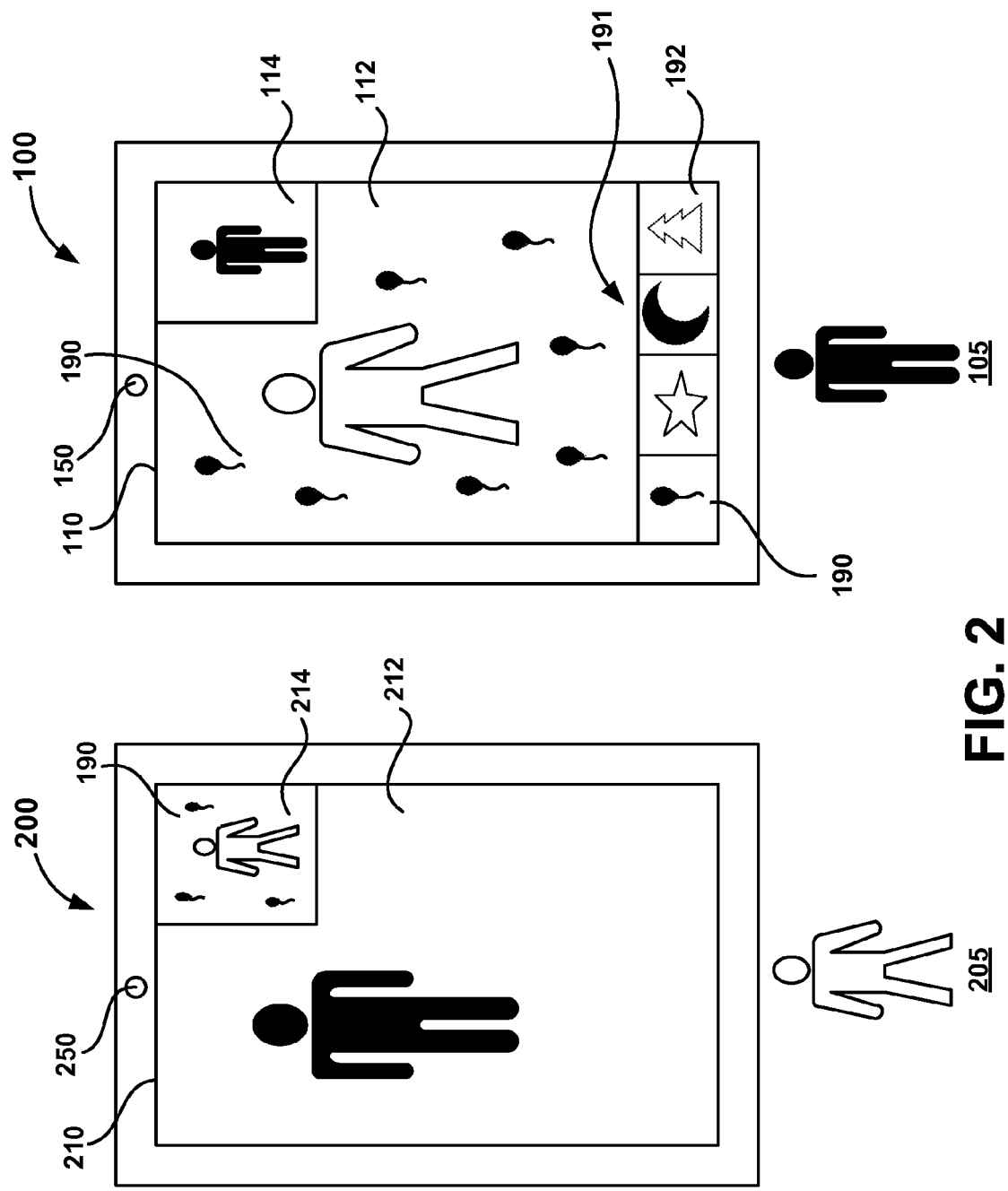

FIG. 2 depicts devices 100 and 200 participating in a video conference. In general, video conferencing allows two or more locations to interact via multi-way video and audio transmissions simultaneously.

The discussion below will first describe the components of device 100. The discussion will then describe the functionality of the components of device 100 during a video conference between devices 100 and 200. Moreover, the discussion will describe, among other things, the communication of video messaging.

Devices 100 and 200 are any communication devices (e.g., laptop, desktop, smartphones, tables, TV, etc.) capable of participating in a video conference. In various embodiments, device 100 is a hand-held mobile device, such as smart phone, personal digital assistant (PDA), and the like.

Moreover, for clarity and brevity, the discussion will focus on the components and functionality of device 100. However, device 200 operates in a similar fashion as device 100. In one embodiment, device 200 is the same as device 100 and includes the same components as device 100.

Device 100 includes display 110, animation selection receiver 120, animation incorporator 130, transmitter 140, camera 150, microphone 152 and speaker 154. Device 100 optionally includes global positioning system 160.

Display 110 is configured for displaying video captured at device 200. In another embodiment, display 110 is further configured for displaying video captured at device 100.

Animation selection receiver 120 is configured to access a selectable animation. A selectable animation is configured for augmenting a video conference, which will be described in detail below.

Animation incorporator 130 is configured for incorporating the selection of the selectable animation 190 into the video conference. For example, animation incorporator 130 is configured for incorporating the selectable animation into a video captured at device 100 and/or device 200. In one embodiment, the animation incorporator 130 includes an animation manipulator 135 that is configured to enable manipulation of the animation in the video conference.

Transmitter 140 is for transmitting data (e.g., animation, control code).

Optionally, device 100 includes one or more of the following: a video camera 150; a microphone 152; a speaker 154; a global positioning system 160, and contact list 170.

Video camera 150 is for capturing video at device 100. It should be appreciated that device 100 may also include an additional camera (e.g., camera 151) on a back face of device 100 facing opposite camera 150. Microphone 152 is for capturing audio at device 100. Speaker 154 is for generating an audible signal at device 100.

Global positioning system 160 is for determining a location of a device 100.

Contact list 170 is a collection or list of names of individuals. In other words, contact list 170 is an address book for user 105. For example, contact list 170 can include, but is not limited to friends, neighbors, employer, coworkers, relatives of user 105.

In one embodiment, contact list 170 is a global contact list. For instance, the global contact list includes information associated with a plurality of individuals listed in the global contact list. The global contact list can be associated with social graphs, social network site, employer, peers, social groups, educational institutions, etc.

Referring now to FIG. 2, devices 100 and 200 are participating in a video conference with one another. In various embodiments, more than two devices participate in a video conference with each another.

During the video conference, video camera 250 captures video at device 200. For example, video camera 250 captures video of user 205 of device 200.

Video camera 150 captures video at device 100. For example, video camera 150 captures video of user 105. It should be appreciated that video cameras 150 and 250 capture any objects that are within the respective viewing ranges of cameras 150 and 250.

Microphone 152 captures audio signals corresponding to the captured video signal at device 100. Similarly, a microphone of device 200 captures audio signals corresponding to the captured video signal at device 200.

The video captured at device 200 is transmitted to and displayed on display 110 of device 100. For example, a video of user 205 is displayed on a first view 112 of display 110. Moreover, the video of user 205 is displayed on a view 214 of display 210.

The video captured at device 100 is transmitted to and displayed on display 210 of device 200. For example, a video of user 105 is displayed on first view 212 of display 210. Moreover, the video of user 105 is displayed on a second view 114 of display 110.

In one embodiment, the audio signals captured at devices 100 and 200 are incorporated into the captured video. In another embodiment, the audio signals are transmitted separate from the transmitted video.

As depicted, first view 112 is the primary view displayed on display 110 and second view 114 is the smaller secondary view displayed on display 110. In various embodiments, the size of both first view 112 and second view 114 are adjustable. For example, second view 114 can be enlarged to be the primary view and view 112 can be diminished in size to be a secondary view. Moreover, either one of views 112 and 114 can be closed or fully diminished such that it is not viewable.

Animation selection receiver 120 receives a selection of a selectable animation 190, via receiving a selection of a selectable animation representation (e.g., an image representing an animation), for augmenting the video conference. An animation is a simulation of movement created by displaying a series of pictures, or frames. In embodiments, animations themselves can be received at device 100 from a server or device 200 and animations can be received at different times. For example, animations can be received when an augmenting application is downloaded onto device 100, during login, or in real-time, when the animations are instructed to be incorporated into the video conference. Further, by not limited to, animations can be received by being downloaded with a video conferencing application, by being downloaded later on as part of a selection (e.g., digital catalog), by being downloaded during a call, by being downloaded when the user interacts with the application, by being downloaded when the application is updated.

Figure 6:
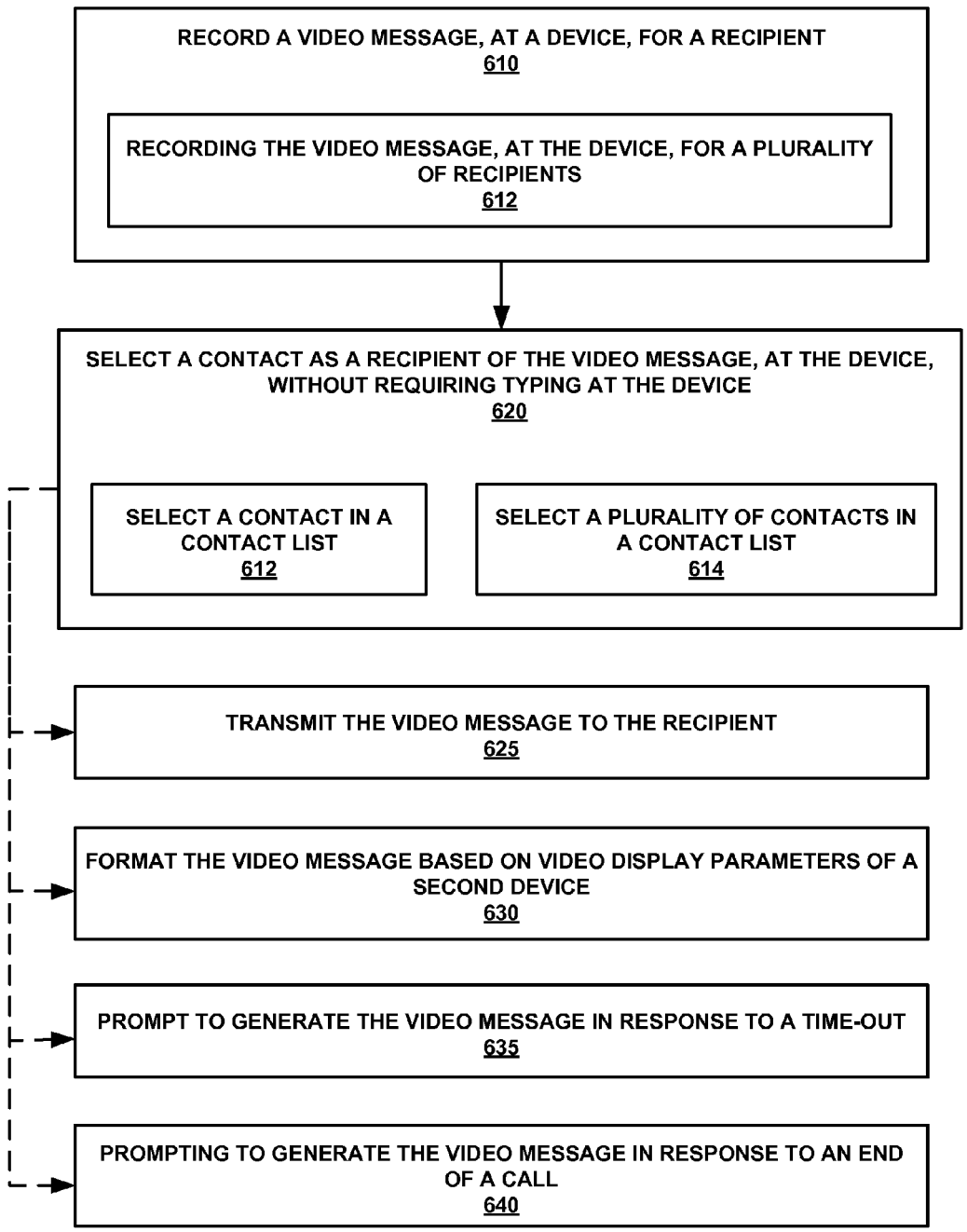
FIGS. 6-7 illustrates embodiments of a method for video messaging.

The set of selectable animation representations 191 that are depicted in FIGS. 2 and 6 (e.g., star, palm tree, flower, rain cloud) are merely a few of any number of examples of animations. It should be appreciated that the set of selectable animation representations 191 may include one or more selectable animation representations. It should be appreciated that an animation can be any object that is capable of augmenting a video conference. In other words, an animation can be any object that is able to supplement the communication between participants in a video conference. For example, animations can be, but are not limited to, a kiss, heart, emoticon, high-five, background (photo-booth type of effects), color space changes, and/or image process changes (e.g., thinning, fattening), or avatars.

It should also be appreciated that is not limited to a viewable animation. For example, an animation can be one of a plurality of sounds, or sounds and video. Additionally, the animations may not necessarily be pre-determined. For example, the displaying of the animations may be a result of an interaction with the user of the application.

In one embodiment, the set of selectable animation representations 191 are displayed on display 110 for viewing by user 105. For example, the set of selectable animation representations 191 are displayed on the animation display bar 192. In one embodiment, the animation display bar 192 is overlaid with first view 112. In another embodiment, the animation display bar 192 is displayed concurrently with first view 112 and/or second view 114.

In various embodiments, the animation display bar 192 is displayed in response to user input, such as, but not limited to key stroke, cursor movement, a detected touch on a touch screen, and designated movement by a user (e.g., expressions, winking, blowing a kiss, hand gesture and the like).

Animation incorporator 130 facilitates in incorporating selectable animation 190 into the video conference. In one embodiment, at device 100, animation incorporator 130 incorporates selectable animation 190 into the video captured at device 200. For example, selectable animation 190 is incorporated above the head of user 205. Therefore, as depicted, video captured at device 200 is incorporated with the selectable animation 190 and the augmented video is displayed at least at device 200. Also, the augmented video with incorporated selectable animation 190 is displayed at device 100.

In one embodiment, user 105 selects selectable animation 190 in the animation display bar 192 and drags the selectable animation 190 to and places it at a location designated by user 105 (e.g., above the head of user 205, as displayed on first view 112). Once placed at the designated location, animation incorporator 130 incorporates animation at the designated location.

In another embodiment, animation incorporator 130 generates control code. The control code instructs how selectable animation 190 is to be incorporated into the video captured at device 200.

For example, control code can be transmitted directly to device 200 to instruct device 200 how selectable animation 190 is to be incorporated into video displayed at device 200. In such an example, control code signals or instructs device 200 that selectable animation 190 is to be displayed in the video conference. In another example, the control code is sent to a server, device 200 then receives the control code from the server and/or corresponding animation.

FIG. 2 depicts the selectable animation 190 incorporated into the video conference. However, it should be appreciated that any number of selectable animations can be incorporated into the video conference at any time. For example, five different animations, represented by selectable animation representations, that are selected from the set of selectable animation representations may be concurrently incorporated into the video conference.

It should be appreciated that the term "incorporate" used herein, is used to describe that a selectable animation 190 is merely displayed along with some portion of the video conference. As such, the selectable animation 190 is merely displayed concurrently with some portion of the video conference. Accordingly, the selectable animation 190 is understood to be incorporated into the video. However, it is not understood that the selectable animation 190 is integrated with or made part of the video stream.

In one embodiment, the selectable animation 190 is superimposed as an overlay on a video. As such, a selectable animation 190 is concurrently superimposed as an overlay displayed on devices 100 and 200. For example, a selectable animation 190 is concurrently overlaid on video displayed in view 112 and view 214 (as depicted in FIG. 2), and a selectable animation can be concurrent overlaid on video displayed in view 114 and view 212 (as depicted in FIG. 6).

In another embodiment, the selectable animation 190 is integrated into the bit stream of the video conference.

In another example, a selectable animation 190 is concurrently overlaid on video displayed in view 112 and view 212. Also, the selectable animation 190 is displayed in a portion of a display independent of the views at the devices and does not require a two-way video to be active (e.g., a one-way video could be active).

It should be noted that the various embodiments described herein can also be used in combination with one another. That is one described embodiment can be used in combination with one or more other described embodiments.

In one embodiment, transmitter 140 then transmits the video captured at device 200, which now includes selectable animation 190, to device 200 (hereinafter, also known as the "second device 200") such that the video including selectable animation 190 is displayed on display 210. In another embodiment, transmitter 140 transmits control code to device 200 (or a server) to instruct device 200 how selectable animation 190 is to be incorporated into the video conference.

Animation manipulator 135 manipulates incorporated selectable animation 190. In one embodiment, selectable animation 190 is manipulated at device 100. For example, in response to user input at a touch screen, user 105 rotates selectable animation 190 clockwise. Accordingly, video captured at device 200 (and displayed on device 100 and/or device 200) is augmented such that the selectable animation 190 spins clockwise.

In another embodiment, selectable animation 190 is manipulated at device 200. For example, in response to user 205 moving his head from left to right, selectable animation 190 is manipulated (via an animation manipulator of device 200) such that it moves from left to right with respect to the head movement of user 205. Accordingly, video captured at device 200 (and displayed on device 100 and/or device 200) is augmented such that selectable animation 190 is moved from left to right.

In a further embodiment, selectable animation 190 is concurrently manipulated at device 100 and device 200. For example, in response to user 205 moving his head from left to right and user 105 spinning the selectable animation 190 (as described above), selectable animation 190 is manipulated such that it concurrently moves from left to right with respect to the head movement of user 205 and spins in response to input from user 105. Accordingly, video captured at device 200 (and displayed on device 100 and/or device 200) is augmented such that selectable animation 190 is moved from left to right while spinning clockwise.

In a further embodiment, selectable animation 190 is directionally manipulated. For example, user 105 sends a "punch" animation (e.g., fist, boxing glove) to user 205. Accordingly, user 105 views the "punch" animation going into display 110 and user 205 views the "punch" animation coming out of display 210.

It should be appreciated that animations are manipulated in response to a variety of inputs. For example, animations can be manipulated via sounds, gestures, expressions, movements, etc. Various examples are: in response to a wink of a user, an animation (e.g., a star) comes out of the eye of the user; and in response to a kiss by a user, red lips fly out of the mouth of the user.

In one embodiment, the set of selectable animation representations 191 are not displayed on display 110 and/or animation display bar 192 until there is at least one of a variety of inputs, as described above. For example, an animation of a heart is not displayed until there is tapping on a touch screen.

Any number of animations can be accessed and/or selected to be incorporated into the video conference. In one embodiment, the set of selectable animation representations 191 are geographical-related animations. For example, the set of selectable animations 191 are based on a location of devices 100 and/or 200.

In particular, if device 100 is located in Hawaii, then the set of selectable animation representations 191 are related to that location. For example, geographical-related animations, based on a location in Hawaii determined from GPS 160, could be, but are not limited to, a surfboard, sun, palm tree, coconut, etc.

It should be appreciated that the determination of location can be provided in a variety of ways. For example, the determination of a location of a device can be based on information provided by a user upon registrations, an IP address of the device or any other method that can be used to determine location.

In another embodiment, the set of selectable animations 191 are temporal-related animations based on a time of the video conference. For example, if the video conference occurs on or around Christmas, then animations would be Christmas related (e.g., stocking, Christmas tree, candy cane, etc.). In another example, if the video conference occurs in the evening, then animations would be associated with the evening (e.g., moon, stars, pajamas, etc.)

In a further embodiment, the set of selectable animation representations 191 are culturally-related animations. For example, if user 105 and/or user 205 are located in Canada, then the set of selectable animation representations 191 could be, but are not limited to, a Canadian flag, hockey puck, curling stone, etc.

In yet another embodiment, the set of selectable animation representations 191 are available and/or accessed based on account status. For example, user 105 has a payable account to have access to the set of selectable animation representations 191. If user 105 has provided adequate payment to the account, then user 105 is able to access the set of selectable animation representations 191. In contrast, if user has not provided adequate payment to the account, then user 105 is unable to access the set of selectable animation representations 191.

Moreover, use and selection of animations can be specifically related to events, holidays, special occasions and the like. Holidays can be, but are not limited to, religious holidays (e.g., Christmas, Easter, Yom Kippur, etc.), national holidays (e.g., New Years, Presidents Day, Memorial Day, etc.) or any other observed holiday (official or unofficial). Events or special occasions can be, but are not limited to, birthdays, anniversaries, graduation, weddings, new job, retirement and the like.

For example, on or around Thanksgiving, animations of a turkey, pumpkin pie, a Pilgrim and the like are selected and/or used. In another example, on or around St. Patrick's Day, animations of a shamrock, a pot of gold, and a leprechaun are selected and/or used. In a further example, on or around Easter, animations of an Easter bunny and Easter eggs are selected and/or used.

In one embodiment, a user is prompted to utilize an animation specifically related to events, holidays, special occasions and the like. For example, on or around the Fourth of July, a user is prompted to select and/or use animations (e.g., fireworks) specifically related to the Fourth of July. In particular, the animations are presented to a user and the user is prompted to send the animations to another user in the videoconference. In other words, the animations are incorporated into the video conference.

In another embodiment, a user can be prompted to send an animation to another user where a relationship between the parties is suspected, known, or inferred. For example, a mother is speaking with her son over a video conference. If the mother/son relationship is suspected, known, or inferred, then the son is prompted to utilize animations (e.g., flowers) specifically related to Mother's Day.

The relationship can be determined in a variety of ways. For example, the relationship can be determined based on, but not limited to, surname, location of users, call logs, etc.

Moreover, the son may be prompted with a message, such as "This appears to be your mother. Is this correct?" As such, if the son responds that he is speaking with his mother, then the son is prompted to utilize animations (e.g., flowers) specifically related to Mother's Day.

It should also be appreciated that animations can enhance revenue stream. For example, 100,000 animations are used on Valentine's Day, and there is a $0.50 fee for each animation. As a result, $50,000 in fees is accumulated on Valentine's Day.

Figure 3:
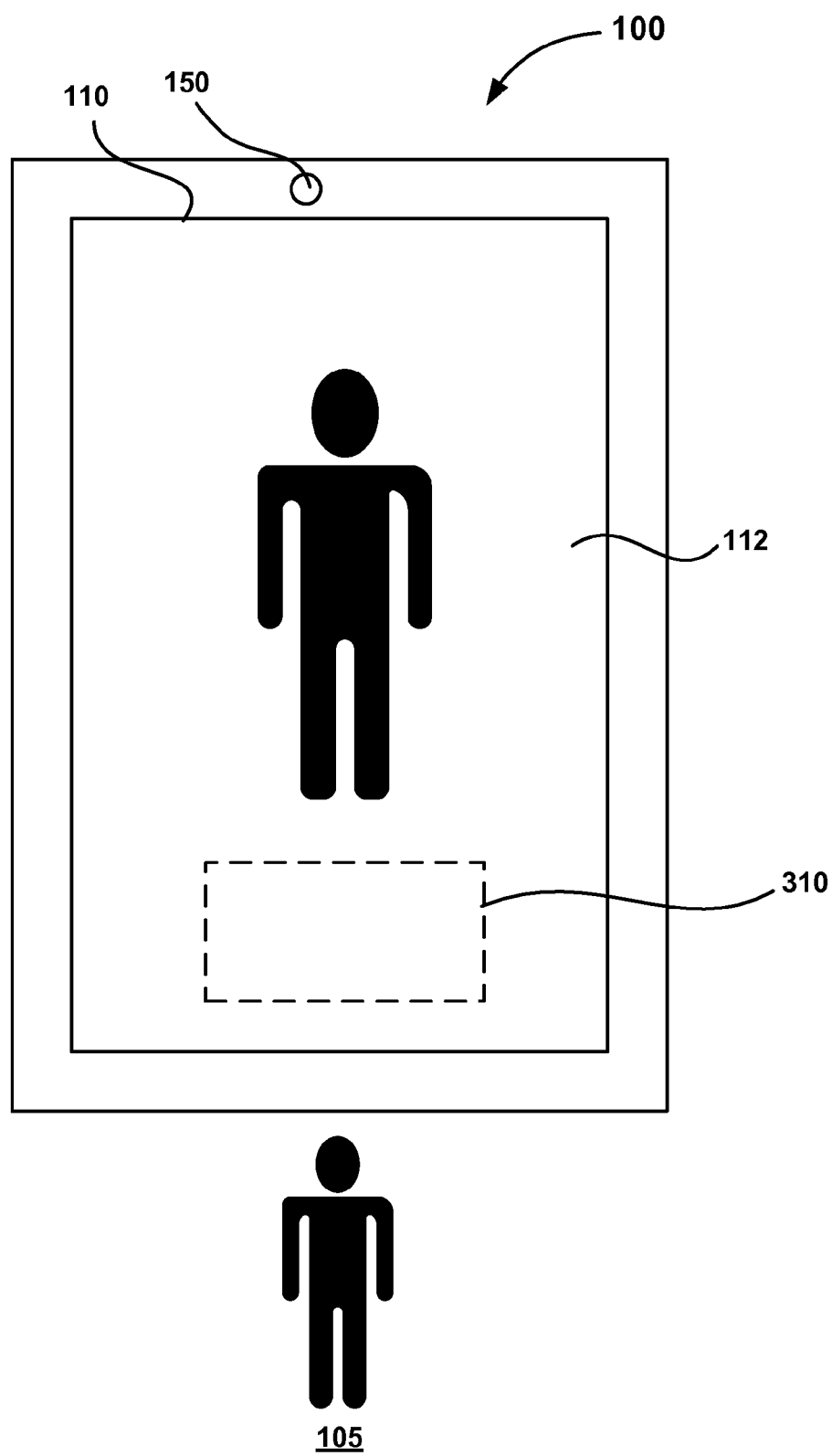

FIG. 3 depicts an embodiment of device 100 utilized to generate a video message. For example, user 105 records a video message captured by camera 150. The video message includes a video of user 105 (as depicted in first view 112) saying "Merry Christmas."

Figure 4:
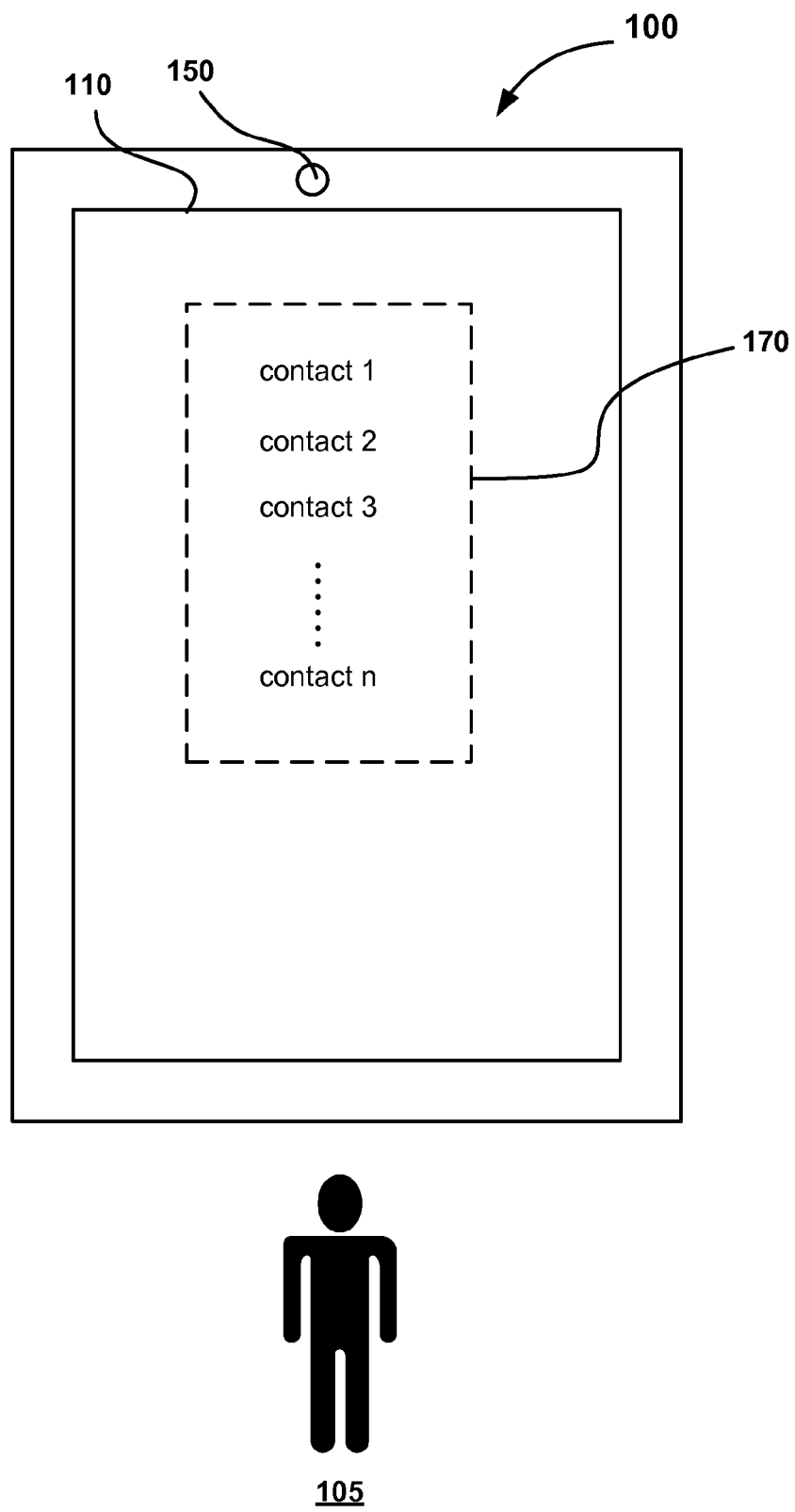

FIG. 4 depicts an embodiment of device 100 displaying contact list 170. Continuing the example above, user 105 is able to select one contact or a plurality of contacts in contact list 170 as recipient or recipients of video message. Once selected, user 105 can "send" the video message to the selected contact(s). For instance, transmitter 140 transmits the video message to device 200 of user 205.

It should be appreciated that a contact (or contacts) can be selected recipients of the video message without requiring typing at device 100. For example, user 105 may scroll along contact list 170 and select to whom the video message will be sent. Accordingly, user 105 is not required to type in a phone number, email address, name or the like in order to select the recipient of the video message and subsequently send the video message.

In one embodiment, user 105 attempts to call user 205. For example, user 105 selects user 205 on contact list 170 and attempts to call user 205 on his phone (e.g., device 200). However, the call is not completed due to one of a variety of reasons. For example, user 205 is busy and chooses not to answer the phone, the network system is down, user 205 is unaware that the call is being placed, etc.

Accordingly, due to the call not being answered, user 105 ends the call (e.g., by pressing "end"). As a result, prompt 310 is displayed. Prompt 310 is for prompting user 105 to leave a video message. For example, prompt 310 states "Would you like leave a video message?" If user 105 selects "No," then no video message is created. However, if user 105 selects "Yes," then user 105 generates a video message for user 205, as described above.

It should be understood that the term "prompt" used herein may be any functionality that provides for serving to suggest or remind a user of an action that may be taken. In one embodiment, a prompt may be a pop-up that suggest an action that may be taken. The pop-up may appear in response to a keystroke or another action taken by a user. In another embodiment, a prompt may be a button or the like (that is not a pop-up) that displays text. The button or the like may be displayed during the entirety a particular screen that is presented to the user.

In one embodiment, user 105 places a call to user 205. In response to placing the call, a pre-determined time-out is started. For example, a time-out of 60 seconds is started. At the end of the time-out and the call not being answered, prompt 310 is displayed.

In another embodiment, user 105 generates a video message without requiring a call or an initiation to communicate with another user. For example, user 105 wishes to leave a video message for user 205. User 105 then simply creates a video message and subsequently sends the message to user 205 without attempting to call user 205 on device 200.

Figure 5:
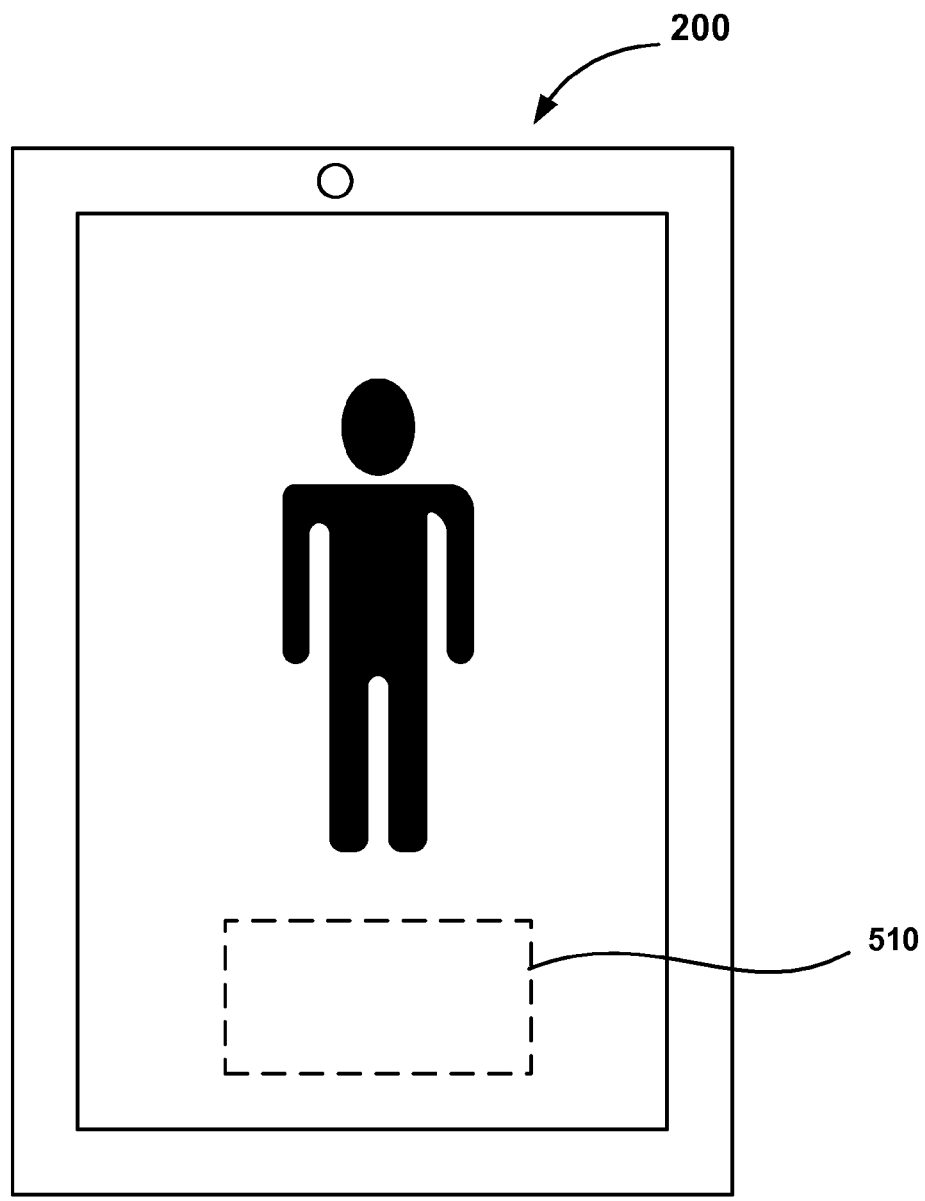

FIG. 5 depicts an embodiment of device 200 displaying a video message. For instance, user 205 receives and views the video message sent by user 105. During playback of the video message, prompt 510 is displayed. Prompt 510 is for prompting user 205 to call user 105 during the viewing of video message. For example, prompt 510 states "Would you like to call John Doe?" If user 205 selects "Yes," then a call is placed to user 105 (i.e., John Doe) such that user 205 and user 105 may have a real-time conversation.

Figure 7:
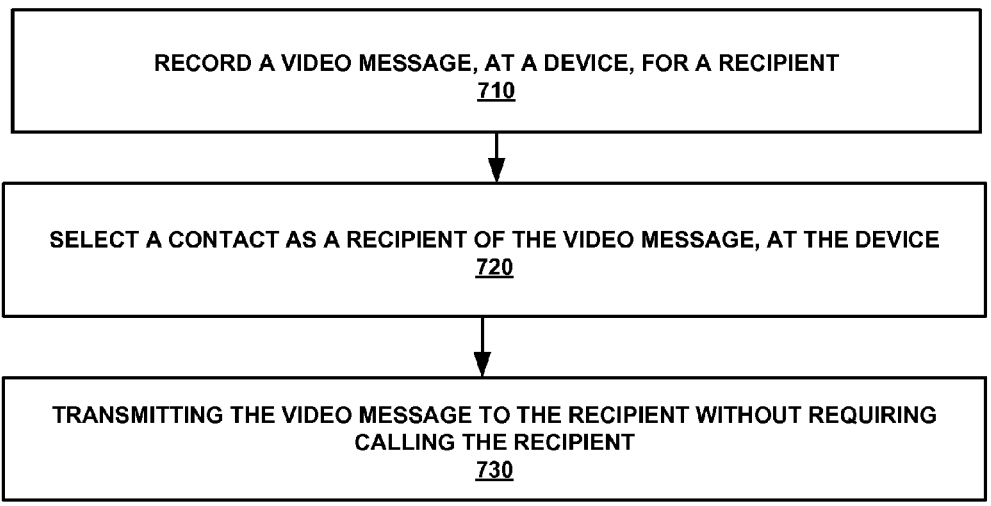

FIGS. 6 and 7 depict embodiments of methods 600 and 700 for video messaging. In various embodiments, methods 600 and 700 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 600 and 700 are performed at least by devices 100 and/or 200.

At 610 of method 600, a video message is recorded for a recipient. For example, user 105 records a video message at device 100. The video message is intended to be sent to and received by user 205 at device 200. It should be appreciated that the video message can be captured via camera 150 or camera 151. As such, the video message can contain a video of user 105 or may not contain a video of user 105. In particular, the video message can include a video of other objects or surroundings in proximity to user 105.

In one embodiment, at 612, the video message is recorded for a plurality of recipients. For example, the video message captured by user 105 is intended for a plurality of people in contact list 170 of user 105.

At 620, a contact is selected as a recipient of the video message, at the device, without requiring typing at the device. For example, user 105 selects user 205 as the recipient of the video message. In particular, user 105 scrolls over "contact 1" in contact list 170 and selects contact 1 without requiring typing at device 100. In other words, user 105 is not required to type the name, phone number or any other text at device 100 in order to select a recipient for the video message to be sent to.

In one embodiment, the recording of the video message occurs prior to the selecting a contact as a recipient of the video message. In another embodiment, the selecting a contact as a recipient of the video message occurs prior to the recording of the video message.

In one embodiment, at 612, a contact is selected from a contact list. For example, contact 2 is selected as a recipient of the video message.

In another embodiment, at 614, a plurality of contacts are selected in the contact list as the recipients of the video message. For example, user 105 selects contacts 1-3 as recipients of a video message containing user 105 saying "Merry Christmas."

At 625, the video message is transmitted to the recipient. For example, the video message captured at device 100 is transmitted by transmitter 140 to device 200 for viewing by user 205. In particular, the video message is transmitted in response to user 105 pressing a button indicating "send" or the like.

At 630, the video message is based on video display parameters of a second device. In various embodiments, transcoding means that are well known in the art are utilized to transcode the video message such that the video message is properly viewed on device that receives the video message from another device. For example, the transcoding enables the video message to be in proper format (e.g., size, orientation, etc) such that it is properly viewed.

At 636, the generation of the video message is prompted in response to a time-out. For example, a time-out of 60 seconds is initiated when user 105 calls user 205. If the call is not answered by the end of the time-out, then prompt 310 is displayed prompting user 105 to generate a video message for user 205.

At 710 of method 700, a video message is recorded for a recipient. For example, user 105 records a video message, at device 100, for user 205 to view the video message at device 200.

At 720, a contact is as a recipient of the video message. For example, user 105 selects user 205, at device 100, as a recipient of the video message.

In one embodiment, the recording of the video message occurs prior to the selecting a contact as a recipient of the video message. In another embodiment, the selecting a contact as a recipient of the video message occurs prior to the recording of the video message.

At 730, the video message is transmitted to the recipient without requiring calling the recipient. For example, user 105 may record and subsequently transmit the video message to user 205 without requiring calling user 205. The term "calling" or "call" as used herein refers to a user of a first device communicating in real-time with user of a second device. For example, user 105 and user 205 conducting a real-time video conference or telephone conversation over devices 100 and 200.

Figure 8:
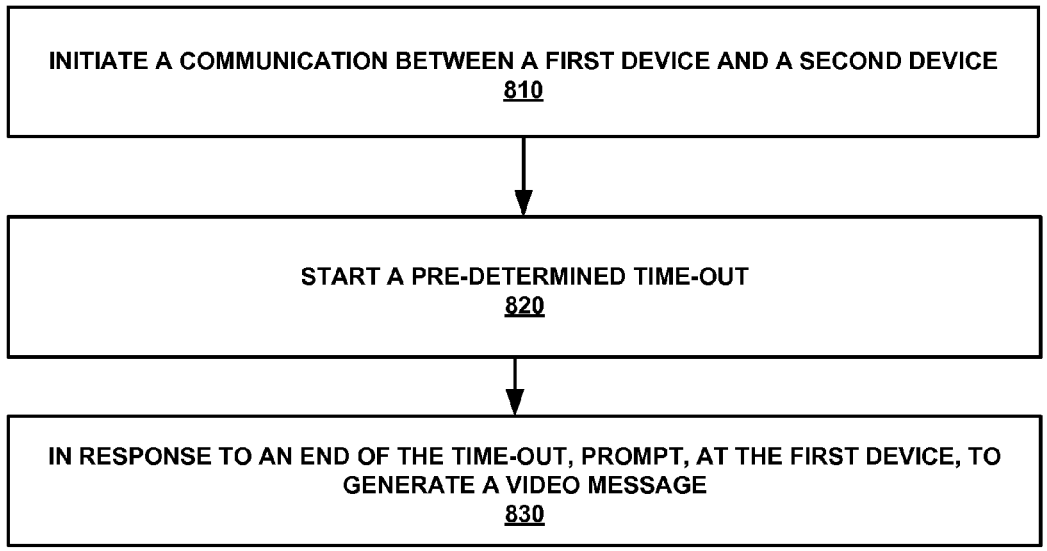
FIGS. 8-9 illustrates embodiments of a method for prompting to generate a video message.
Figure 9:
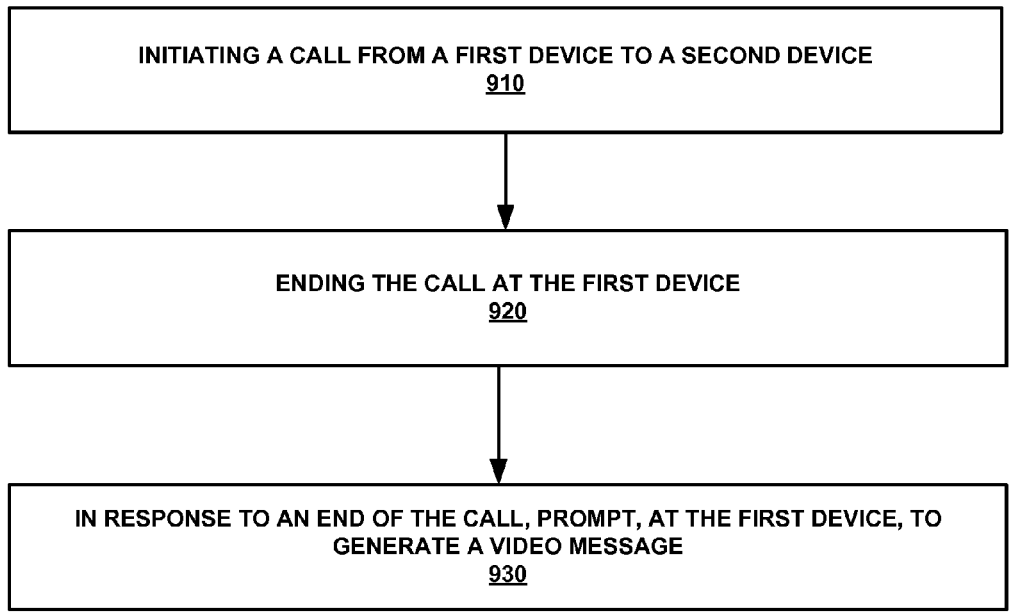

FIGS. 8 and 9 depict embodiments of methods 800 and 900 for prompting to generate a video message. In various embodiments, methods 800 and 900 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 800 and 900 are performed at least by devices 100 and/or 200.

At 810 of method 800, a communication is initiated between a first device and a second device. For example, user 105 using device 100 initiates a phone call to user 205 using device 200.

At 820, a pre-determined time-out is started. For example, a time-out of 90 seconds is initiated in response to the user 105 calling user 205.

At 830, in response to an end of the time-out, a prompt is displayed at the first device to generate a video message. For example, user 205 does not answer the call from user 105 after 90 seconds, accordingly, prompt 310 is displayed which prompts user 105 to generate a video message for user 205.

At 910 of method 900, a call is initiated from a first device to a second device. For example, a telephone call from device 100 is made to device 200.

At 920, the call is ended at the first device. For example, user 205 does not answer the phone call from user 105. As such, user 105 ends the call by hanging up the phone (e.g., pressing "end").

At 930, in response to an end of the call, a prompt is displayed, at the first device, to generate a video message. For example, in response to user 105 ending the phone call, prompt 310 is displayed which prompts user 105 to generate a video message for user 205.

Figure 10:
FIG. 10 illustrates an embodiment of a method for callback during playback of a video message.

FIG. 10 depicts an embodiment of methods 1000 for callback during playback of a video message. In various embodiments, method 1000 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 1000 is performed at least by devices 100 and/or 200.

At 1010 of method 1000, a video message is viewed at a first device, wherein said video message is from a user of a second device. For example, user 205 views, at device 200, a video message from user 105.

At 1020, a user of the first device is prompted to call said user of the second device while viewing the video message. For example, user 205 is prompted with prompt 510 to callback user 105 while user 205 is viewing the video message from user 105.

Figure 11:
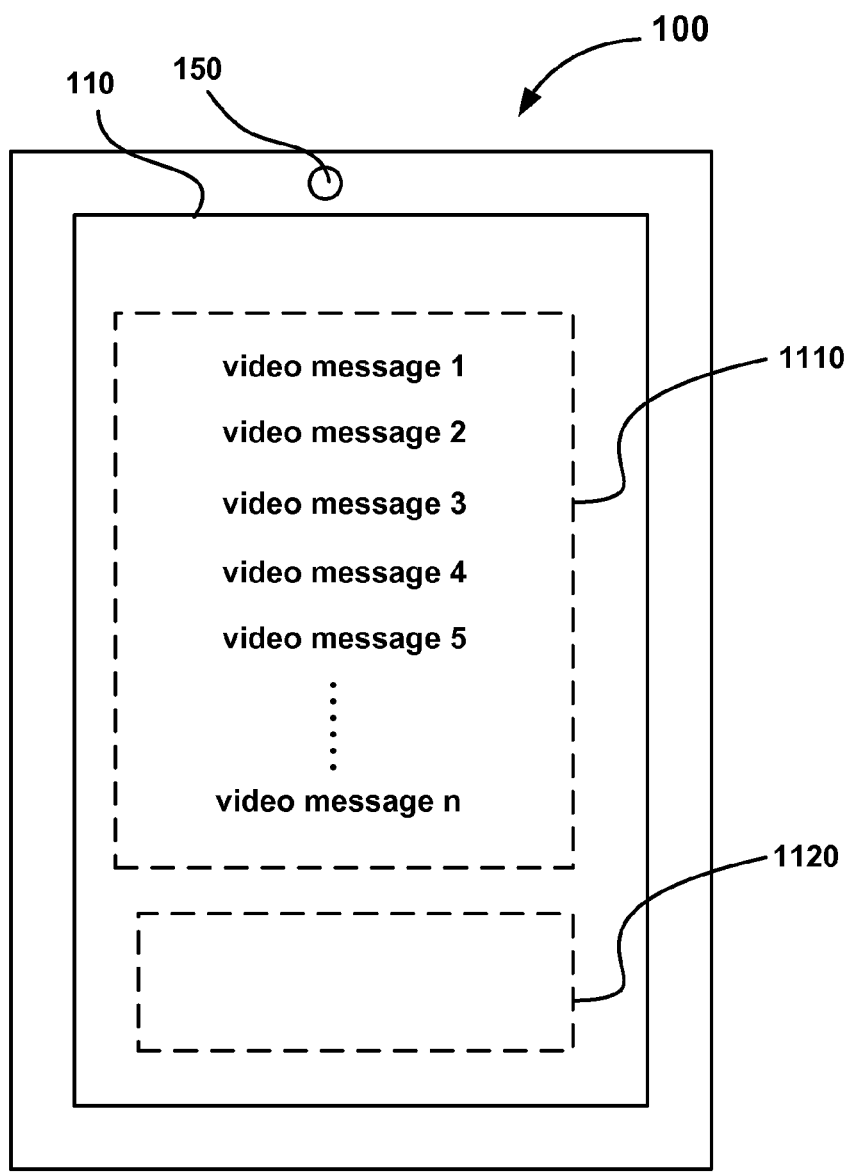
Figure 11:
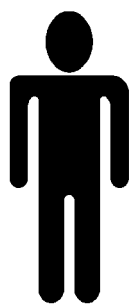

FIG. 11 depicts an embodiment of a list of video messages. For instance, user 105 is a recipient of video messages. As such, a list of video messages 1110 may be displayed on device 100. The list of video messages may be listed in chronological order, by name of the person who sent the video message, etc.

In one embodiment, each video message may be listed by the name of the person who sent the message. For example, video message 1 is listed as "Jane Doe" because it was sent from Jane Doe, while video message 2 is listed as "John Doe" because it was sent from John Doe.

The video messages may be selected by user 105. For example, user 105 may scroll over the list of video messages and select a particular message that is desired be played back.

In one embodiment, all of the video messages are accessible. That is, any of the video messages may be selected for playback in response to the user selecting that particular video message.

In another embodiment, a subset of video messages 1110 are not accessible for playback. Although the subset of video messages 1110 are listed, they are not available for playback. For example, only the most recent three video messages are available. Accordingly, user 105 may select any of the three most recent videos for immediate playback.

However, any of the subset of video messages (e.g., video message 4 through video message n) may not be accessible for immediate playback. If any of the video messages in the subset of video messages are selected, then prompt 1120 is displayed to prompt user 105 to purchase access to the selected video message or any other of the video messages in the subset of video messages.

In another embodiment, if any of the video messages in the subset of video messages are selected, a purchase screen is displayed such that user 105 may purchase access to the selected video message or any other of the video messages in the subset of video messages The subset of video messages may be visually distinct from the other video messages. For example, the three most recent video messages may be in black font, while the subsequent video messages may be "grayed out." In another example, a line may be displayed between the five most recent video messages and the subsequent video messages indicating that the five most recent messages are available for immediate playback while the subsequent video messages are not accessible for immediate playback.

FIG. 12 depicts an embodiment of methods 1200 for monetization of video messaging. In various embodiments, method 1200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 1200 is performed at least by devices 100 and/or 200.

At 1210 of method 1200, a list of video messages is displayed, wherein a first subset of the video messages in the list are not accessible for playback. For example, a list of video messages 1110 is displayed. In particular, a first subset of video messages (e.g., video message 4 through video message n) are listed, however, they are not accessible for immediate playback.

At 1220, selection of the video messages is allowed. For example, any of the listed video messages are able to be selected for playback. However, some video messages may be listed but they may not be accessible for immediate playback.

At 1230, in response to selecting a video message of a first subset, a user is prompted to purchase access to playback the video message of the first subset selected by the user. For example, if user 105 selects any, some or all of video message 4 through video message n, then user 105 is prompted by prompt 1120 to purchase access to the selected video messages in the first subset of video messages not accessible for immediate playback. In such an example, the prompt may state "Monthly Plan—$4.99" with a button stating "Get it Now." If user selects the button, then the user purchases a monthly plan for $4.99 to gain access to video messages in the first subset of video messages, as described above. Accordingly, the service provider of the management of the video messages receives the $4.99.

In one embodiment, at 1232, the user is prompted to purchase a recurrent subscription. For example, a user is prompted to purchase a recurrent yearly subscription for access to all of the video messages.

In another embodiment, at 1234, the user is prompted to purchase a non-recurring trial subscription. For example, user 105 is prompted to purchase a non-recurring 10-day trial for access to immediate playback to all of the video messages.

In a further embodiment, at 1235, the user is prompted to purchase a one-time fee subscription. For example, user 105 is prompted to purchase a one-time fee subscription for access to immediate playback of all the video messages.

In one embodiment, a video message may be selected to be transferred or downloaded to a user's personal media library. For example, user 105 selects any of the video messages to be transferred to his personal video library. In such an example, the user may be prompted to purchase the ability to transfer the selected video message to his personal media library.

It should be appreciated that monetization, as described above, is not limited to video messages. For example, monetization can be applied to other features/services used by devices 100 and/or 200. In one embodiment, selectable animation 190 may be purchased for use in the call between device 100 and 200.

Thus, the monetization of the method for augmenting a video conference with one or more animations includes making known to the user of device 100 and/or 200 those animation features that are available for purchase. Various embodiments include providing a sequence of selectable tabs overlaid on a user interface that enable a user to make desired and convenient selections. These choices include, but are not limited to the following: subscribing to packages for a specific monetary amount for a certain period of time; and accepting a free animation "pre-trial". In general, the selectable choices regarding a subscription are generated and communicated to the users of devices 100/200, in some embodiments, at the end of the video conference. As described herein, if it is determined that a user does not possess the required subscription to access particular animations, a subscription offer is then made to the user via purchase information detailed on selectable images.

Various embodiments are thus described. While particular embodiments have been described, it should be appreciated that the embodiments should not be construed as limited by such description, but rather construed according to the following claims.

What we claim is:

1. A computer-implemented method for monetization of video messaging, said method comprising:
    displaying a list of video messages, wherein said list is displayed such that each listed video message of said list of video messages is displayed simultaneously, wherein a first subset of said video messages in said list is not accessible for playback until a purchase by a user occurs;
    allowing for selection of a video message of said first subset of said video messages; and
    in response to selecting said video message, prompting said user to purchase access to playback said video message selected by said user.

2. The computer-implemented method of claim 1, further comprising:
    prompting said user to purchase a recurrent subscription to gain access to all of said first subset of video messages.

3. The computer-implemented method of claim 1, further comprising:
    prompting said user to purchase a non-recurring trial subscription to gain access to all of said first subset of video messages.

4. The computer-implemented method of claim 1, further comprising:
    prompting said user to purchase a one-time fee subscription to gain access to all of said first subset of video messages.

5. The computer-implemented method of claim 1, wherein a display of each listed video message of said first subset of video messages are visually distinct from other listed video messages within said list of video messages.

* * * * *